Dec. 7, 1948.　　　　S. S. ROBINSON, JR　　　　2,455,442
BALING PRESS AND BALING METHOD
Original Filed June 9, 1941　　　　　　　　2 Sheets-Sheet 1
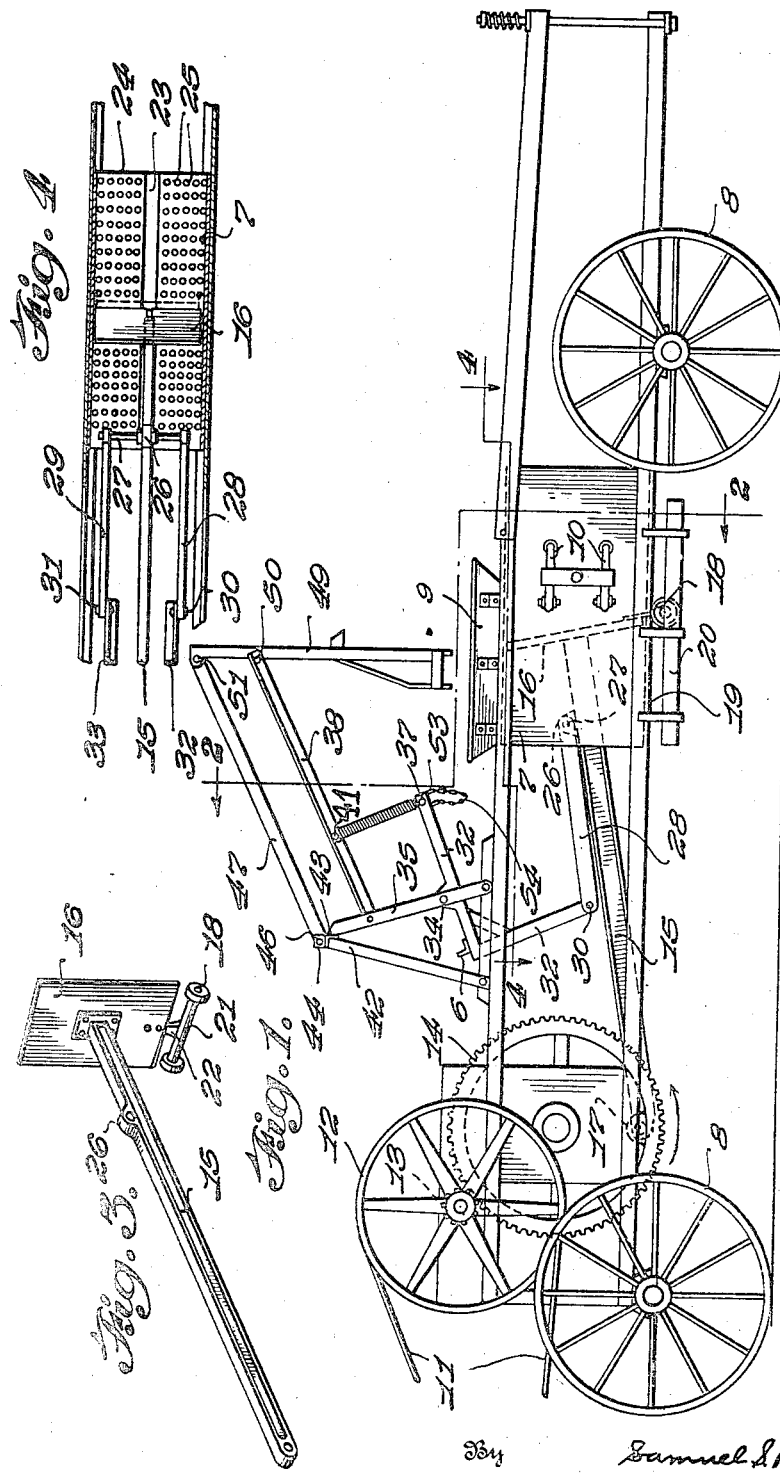
Inventor
Samuel S. Robinson, Jr.
By
Davis & Davis
Attorneys

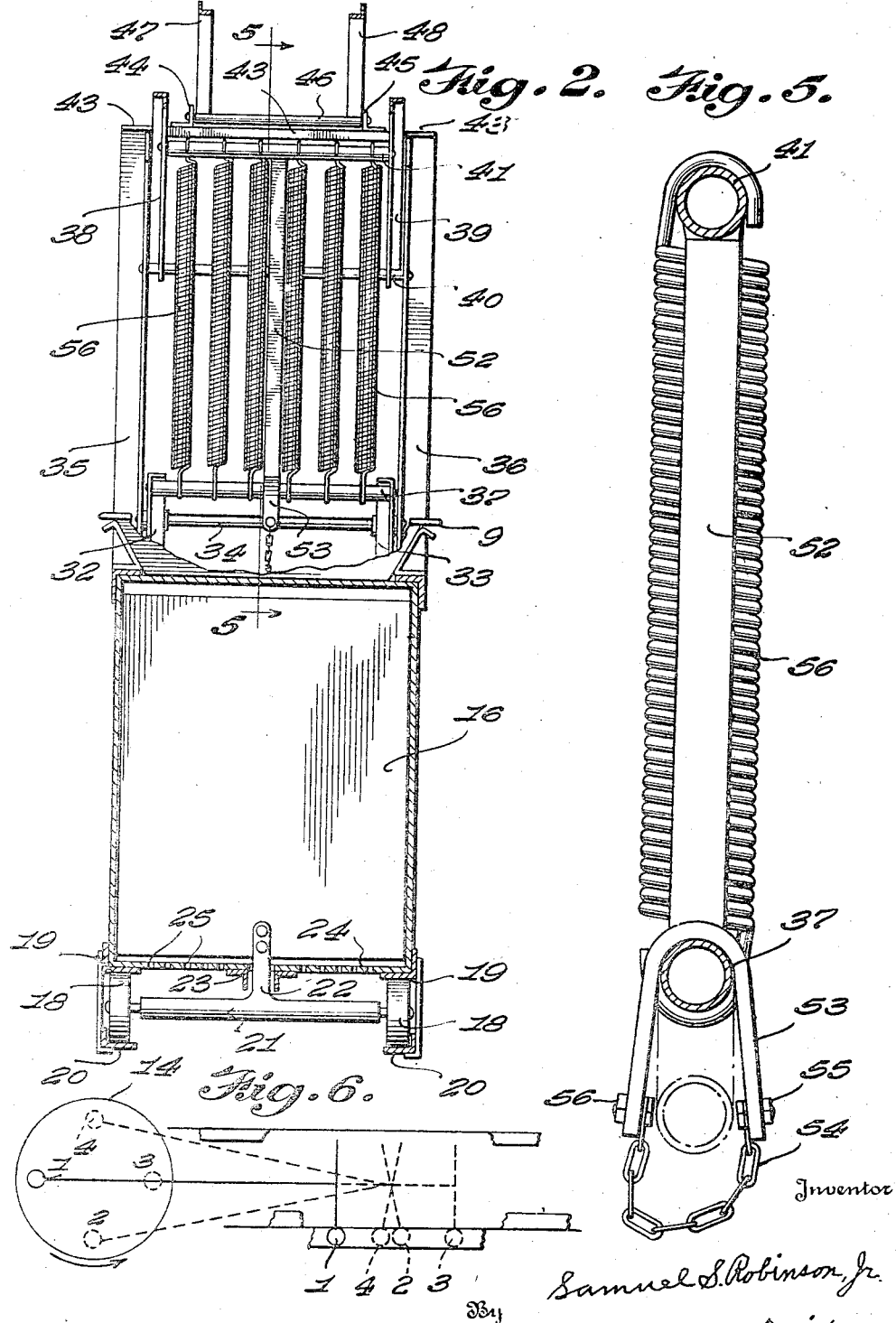

Patented Dec. 7, 1948

2,455,442

UNITED STATES PATENT OFFICE 2,455,442

BALING PRESS AND BALING METHOD

Samuel Straughan Robinson, Jr., United States Army, Albany, Ga., assignor to Lilliston Implement Company, Albany, Ga., a corporation of Georgia Original application June 9, 1941, Serial No. 397,315, now Patent No. 2,366,426, dated January 2, 1945. Divided and this application November 23, 1944, Serial No. 564,781

4 Claims. (Cl. 100—3)

This application is a division of my copending application Ser. No. 397,315, filed June 9, 1941, and issued on Jan. 2, 1945, as Patent No. 2,366,426 and relates to an improved method and means for compressing hay, fodder, straw, and material of similar nature, and more particularly to improved baling method, and baler head and baling chamber assembly.

An object of my invention is to provide an improved method of compressing materials and improved baler head and baling chamber assembly whereby the friction and wear on the bottom of the baling chamber may be reduced to a minimum.

The bottom of the bale chamber of the conventional type of baling press is subject to great wear and friction. Heretofore, in the conventional type of baling press, it has been necessary to use a very heavy bottom for the baling chamber to withstand such friction and wear or to replace the worn bottom of the baling chamber at frequent intervals. It is, therefore, an object of my invention to provide means for preventing the unnecessary wear and friction on the bottom of the baling chamber.

Another object of my invention is to provide an improved and simplified baler head assembly whereby the baler head is caused to operate on the compression stroke so that the lower end of the baler head is further advanced than the upper end thereof, until the very end of the said stroke. Thus, the pressure applied by the said baler head is directed into the hay or other material to be baled so as to force the same forwardly and upwardly from the bottom of the baler rather than downwardly, thereby reducing the wear on the bottom of the baler.

It is a further object of my invention to provide rollers attached to the said baler head and mounted on tracks, separate from the bottom of the baler, in such a manner as to keep the baler head from engaging or wearing the bottom of the baler. The said rollers also are adapted to prevent the baler head from rising in the baling chamber and are further adapted to serve as a pivot for the baler head.

It is a further object of my invention to provide a sturdy and simplified construction to accomplish the foregoing, which will eliminate, insofar as possible, all unnecessary wearing of parts, and a baling press which may be manufactured at low cost and easily and efficiently operated.

Other objects and advantages of my invention are set forth in the following description, taken with the accompanying drawings, and the novel features thereof are pointed out in the appended claims. The disclosure, however, is illustrative only, and I may make changes in detail especially in matters of shape, size and arrangement of parts within the principle of the invention to the full extent indicated by the broad and general meanings of the terms in which the appended claims are expressed.

On the drawings:

Figure 1 is a side elevation of a baling press illustrating my invention.

Figure 2 is an enlarged sectional view taken along the line 2—2 of Figure 1 with certain parts broken away.

Figure 3 is a perspective view of the baler head.

Figure 4 is a horizontal sectional view of the baling chamber taken along the line 4—4 of Figure 1.

Figure 5 is an enlarged sectional view of the tension spring assembly taken along the line 5—5 of Figure 2.

Figure 6 is a diagrammatic view illustrating the operation of the baler head.

Similar characters of reference refer to similar parts and portions throughout the several views of the drawings.

In the embodiment of my invention, illustrated in Figure 1, there is provided a baling chamber 7 mounted upon wheels 8 in the conventional manner. The said baling chamber 7 has provided a hopper 9 of the ordinary type open at the top so that the baling material can be conveniently supplied to the baling chamber. Mounted on the sides of the said baling chamber 7 are customary bale retainers 10.

The baling press is operated by power transmitted from an engine, not shown, through belt 11 to a wheel 12 rotatably mounted at one end of the frame of the baling chamber. The said wheel 12 is geared to a large gear wheel 14 by a small gear 13 connected to the said wheel 12. The large gear wheel 14 is rotatably mounted on the frame of the baling chamber and is adapted to revolve in a counterclockwise direction, as indicated by the arrow in Figures 1 and 6.

A pitman arm 15 is provided for transmitting power from the driven gear wheel 14 to a baler head 16. The said pitman arm 15 is pivotally connected to the large gear wheel 14 through the medium of an eccentric pin 17 and the said pitman arm 15 is rigidly fastened to the baling head 16 as shown in Figures 1 and 3.

The baling head 16 rides on rollers 18 as shown in Figures 1 and 2. The said rollers 18 are adapted to move along tracks 19 and 20. The rollers 18 are rotatably mounted on an axle 21 which is fastened by a stem 22 to the lower end of the baler head 16. The said stem 22 is movably mounted in a slot 23 provided in bottom 24 of the baling chamber 7.

The bottom 24 of the baling chamber 7 has provided apertures 25 through which dirt, dust and other fine material may readily sift, thereby lessening the friction and wear on the bottom 24. Further, it will be readily seen that, as the wheel 14 revolves in the direction shown by the arrow in Figures 1 and 6, the baler head on the compression stroke will be directed into the baling material in such a manner as to force the said material upward and forward. This is shown graphically in Figure 6. Thus, with the wheel 14 in the position 1 the pitman will be in a horizontal position and the forward surface of the baler head 16 will be vertical, preparatory to beginning the compression stroke. As the wheel 14 revolves on the compression stroke from position 1 to position 2 the forward surface of the baler head will vary from the vertical position in proportion to the variance of the pitman arm from a horizontal position. In the position indicated in Figure 6 by the numeral 2 the lower end of the baler head 16 will be further advanced than the upper end of the baler head 16. As the wheel 14 continues to revolve on the compression stroke from position 2 to position 3 the pitman arm will vary from the position at an acute angle to the horizontal position and the forward surface of the baler head will be adjusted so that at the end of the compression stroke the forward surface will be in a vertical position. Upon the wheel 14 revolving on the return stroke to the position indicated by numeral 3, the forward surface of the baler head 16 is directed downwardly; and upon the wheel 14 revolving to the position 1 the forward surface of the baler head 16 will once again resume a vertical position.

It will thus be seen that there is imparted to the pitman arm 15 not only a reciprocating movement, but also a swinging movement in a vertical plane which causes the baler head to be pivoted on the rollers 18.

It will be readily seen that by directing the baler head on the compression stroke forward and upward into the baling material less wear will result on the bottom of the baling chamber.

Further, it will also be readily seen, since the baler head does not drag along the bottom the baling chamber as in the conventional type, but is rather mounted on rollers which move on tracks separate and apart from the baling chamber, that less wear on the bottom of the baling chamber will result than in the conventional type of baling press.

Further, it will be readily seen that the pivoting and moving parts which would be subject to wear have, through my combination, been reduced to a minimum.

Further, pivotally attached to the pitman arm 15 at 26 is a rod 27 having pivotally fastened at the opposite ends thereof links 28 and 29 as shown in Figure 4.

The links 28 and 29 are pivotally connected at 30 and 31 to lever arms 32 and 33, respectively. The lever arms 32 and 33 are rigidly connected by angle bar 6 and a rod 34. The said rod 34 is pivotally connected to standards 35 and 36 mounted on the baling chamber frame as shown in Figures 1 and 2 whereby the lever arms 32 and 33 may be conveniently pivoted.

Mounted at the upper end of the lever arms 32 and 33 and connecting the same is a bar 37, the purpose of which will be explained hereinafter.

Further, angle bars 38 and 39 are connected at one end by a bar 40 which is in turn pivoted to the standards 35 and 36, at a point above the pivotal connection of the bars 32 and 33 to the said standards.

Further, connecting the angle bars 38 and 39 at a position intermediate the opposite ends thereof is a bar 41 the purpose of which will be explained.

Besides the standards 35 and 36, a second pair of supporting standards 42 are provided having the lower end thereof secured to the frame of the baling chamber and the upper end welded or fastened in any convenient manner to an angle bar 43. The angle bar 43 connects the upper ends of the said supporting standard 42, and is welded or connected in any convenient manner to the upper ends of the standards 35 and 36 connecting the same and fastening the standards 35 and 36 as shown in Figures 1 and 2.

Mounted on the angle bar 43 are vertically projecting members 44 and 45 between which there is rotatably mounted a pivotal rod 46. Angle bars 47 and 48 at the lower end thereof are fastened to the pivotal rod 46. The said bars 47 and 48 extend parallel to and above the respective bars 38 and 39. The said bars 47 and 48 are pivotally attached at the upper end thereof by member 51 to the upper end of a tramper or feeder bar 49. Also the angle bars 38 and 39 extending parallel to and spaced apart from the bars 47 and 48 are pivotally connected by a member 50 to the tramper or feeder bar 49 as shown in Figure 1.

The bars 38 and 39 and the bars 47 and 48 are adapted to guide the feeder bar or tramper.

Secured to the bar 41 by welding, or other convenient means, is a downwardly extending reciprocating bar 52 shown in Figure 2 and in detail in Figure 5. Attached at the lower end of the said bar 52 is an inverted U-shaped strap 53, adapted to fit over the bar 37, and releasably engage the same. There is, further, provided a chain member 54 attached at the opposite ends thereof by nut and bolt members 55 and 56 to the opposite ends of the said strap 53. The said strap 53 and chain member 54 thereby surrounding the bar 37, but permitting free movement therein. The chain member 54 serves as a convenient means for preventing the rod 37 from becoming displaced from the strap 53. Further, there are provided spring tension members 56 attached at opposite ends to the bars 41 and 37. The tendency of the spring tension means 56, attached between the bars 41 and 37, is to hold bar 37 in engaging relationship with the strap member 53 of the reciprocating bar 52.

Thus, upon the lever 37 being directed upwardly by the pivotal action of the lever arms 32 and 33, due to forward movement of the pitman arm 15, the bar 37 will force the bar 52 upwardly and cause the bar 38 to likewise be pivoted upwardly. This action will in turn cause the feeder bar 49 to be moved upwardly with the pivotal guide bars 47 and 48.

Further, upon the lever 37 being directed downwardly by the pivotal action of the lever arms 32 and 33 due to the rearward movement of the pitman arm 15, the spring tension members 56 will transmit this movement to the bar 41, which under the force of gravity and the tension of the said spring members 56, will be projected downwardly causing the downward movement of the feeder bar 49 into the baling chamber 7 through open hopper 9.

It would be readily apparent that upon a sudden shock or obstruction to the feeder bar the same will be taken up by the spring tension means 56. The said spring tension means provided herein permits all desirable release in the case of any obstruction across the hopper. The springs in such case yielding sufficiently to permit the complete revolution of the gear wheel 14 without damage to any part of the tramper or bailing press.

Furthermore, the spring tension means provided herein is adapted to yield with equal efficiency within the limits required rather than yielding less readily as the spring continues to yield as in the conventional compression spring.

Furthermore, in the tension spring mounting provided herein, wearing parts such as slides and guides provided in the conventional compression spring assemblies are not necessary for the proper operation of my invention, thereby reducing loss by friction and wear to a minimum.

Having thus described my invention, what I claim as my invention and desire to secure by Letters Patent, is:

1. In a baling press, a baling chamber having a bottom provided therein, a baler head mounted in said chamber, a pitman arm rigidly fastened at one end to said baler head, a roller mounted on said baler head, a track carried by said baling chamber adapted to support said roller in such a manner as to prevent any part of said baler head from dragging along the bottom of said baling chamber, means pivotally supporting said pitman arm at its other end, and means adapted to move said pitman arm in such a manner as to impart a forward movement and rearward tilt to the baler head on the compression stroke of said baler head and a rearward movement and forward tilt to said baler head on the return stroke of said baler head.

2. The combination defined by claim 1 in which the last mentioned means include a drive wheel operatively connected to said pitman arm, said baling chamber has a longitudinal slot therein, and said baler head is provided with a part depending through said slot and carrying said roller exteriorly of said chamber and movable on said track.

3. In a baling press, a baling chamber, a baler head, power means for causing a reciprocating movement of said baler head within said baling chamber, said baling chamber having a bottom provided with a plurality of apertures for discharging fine material from the baling chamber so as to lessen the friction and wear on the bottom thereof, said bottom having a longitudinal slot formed therein, a stem connected at one end to said baler head and extending through said slot and movable longitudinally in said slot, an axle carried by the opposite end of said stem and exteriorly of the chamber, the axle extending tranverse the bottom of the chamber, roller members mounted at opposite ends of the axle, tracks underlying and affixed to the bottom of said baling chamber, the roller members rotatably mounted on said tracks so as to support the baler head exteriorly of the chamber and in such a manner as to prevent any part of the baler head from moving upon the bottom of the baling chamber at any time in frictional relation therewith, and means connecting said power means to said baler head for pivoting said baler head upon said roller members in such a manner as to tilt said baler head rearward on its compression stroke and forward on its return stroke so as to prevent the baler head from forcing baling material toward the bottom of the baling chamber during the compression stroke.

4. The method of compressing hay, fodder, straw and other material of a similar nature by means of a reciprocating baler head operating in a baling chamber, comprising the steps of first feeding said material to said chamber, and second at the commencement of the compressing operation inclining the baler head in a direction opposite to the direction in which the material is being compressed so as to lessen the wear and friction on the bottom of the baling chamber, and third varying the angle of inclination of the baler head so that the baler head assumes during such operation a normal vertical position only at the point of completion of the compressing operation.

SAMUEL STRAUGHAN ROBINSON, Jr.

REFERENCES CITED

The following references are of record in the file of this patent:

UNITED STATES PATENTS

| Number | Name | Date |
| --- | --- | --- |
| 250,895 | Dederick | Dec. 13, 1881 |
| 939,466 | Bothwell | Nov. 9, 1909 |
| 1,825,600 | Nichols | Sept. 29, 1931 |
| 2,366,426 | Robinson, Jr. | Jan. 2, 1945 |

FOREIGN PATENTS

| Number | Country | Date |
| --- | --- | --- |
| 187,393 | Great Britain | Oct. 26, 1922 |